(12) United States Patent
Yamashita (10) Patent No.: US 8,768,571 B2
(45) Date of Patent: Jul. 1, 2014

(54) STEERING DEVICE FOR VEHICLE (75) Inventor: Masaharu Yamashita, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 791 days.

(21) Appl. No.: 12/936,594

(22) PCT Filed: Apr. 3, 2009

(86) PCT No.: PCT/IB2009/005176
§ 371 (c)(1),
(2), (4) Date: Oct. 6, 2010

(87) PCT Pub. No.: WO2009/125269
PCT Pub. Date: Oct. 15, 2009

(65) Prior Publication Data
US 2011/0035108 A1     Feb. 10, 2011

(30) Foreign Application Priority Data
Apr. 9, 2008   (JP) ................................ 2008-101455

(51) Int. Cl.
*B62D 6/00*   (2006.01)
(52) U.S. Cl.
USPC .............. 701/43; 180/446; 318/434; 701/41; 701/44
(58) Field of Classification Search
USPC .......... 180/443, 446; 318/434, 560, 563, 564, 318/565, 566, 609; 701/41, 42, 43, 44
See application file for complete search history.

(56) References Cited

U.S. PATENT DOCUMENTS

| | | | | |
|---|---|---|---|---|
| 4,056,160 A | * | 11/1977 | Abels et al. | 180/423 |
| 4,567,413 A | * | 1/1986 | Yabe et al. | 318/489 |

(Continued)

FOREIGN PATENT DOCUMENTS

| | | |
|---|---|---|
| EP | 0 708 010 | 4/1996 |
| EP | 1 810 909 | 7/2007 |

(Continued)

OTHER PUBLICATIONS

International Search Report issued Aug. 3, 2009 in PCT/IB09/005176 filed Apr. 3, 2009.

(Continued)

*Primary Examiner* — Stephen Holwerda
(74) *Attorney, Agent, or Firm* — Oblon, Spivak, McClelland, Maier & Neustadt, L.L.P.

(57) ABSTRACT

A vehicle steering device has an electric power abnormality detection portion that detects abnormality of the source power supply capability of an electric power source device, a vehicle speed detection portion that detects the vehicle speed, and a motor control portion that controls the driving of the electric motor on the basis of the steering torque detected by the steering torque detection portion. The motor control portion enhances the output restriction of the electric motor if the vehicle speed detected by the vehicle speed detection portion declines while the abnormality of the source power supply capability of the electric power source device is detected by the electric power abnormality detection portion.

9 Claims, 5 Drawing Sheets

(56) References Cited

U.S. PATENT DOCUMENTS

| | | | |
|---|---|---|---|
| 4,574,903 A * | 3/1986 | Hashimoto et al. | 180/446 |
| 4,961,033 A * | 10/1990 | Hirota | 318/560 |
| 5,000,278 A * | 3/1991 | Morishita | 180/446 |
| 5,259,473 A * | 11/1993 | Nishimoto | 180/446 |
| 5,303,156 A * | 4/1994 | Matsuoka et al. | 701/43 |
| 5,752,209 A * | 5/1998 | Nishimoto et al. | 701/41 |
| 5,839,537 A * | 11/1998 | Nishino et al. | 180/443 |
| 5,927,430 A * | 7/1999 | Mukai et al. | 180/446 |
| 6,422,335 B1 * | 7/2002 | Miller | 180/446 |
| 2002/0057070 A1* | 5/2002 | Thomsen et al. | 318/801 |
| 2007/0169987 A1* | 7/2007 | Fujiyama | 180/446 |
| 2008/0066994 A1 | 3/2008 | Fujita et al. | |

FOREIGN PATENT DOCUMENTS

| | | |
|---|---|---|
| EP | 1 900 606 | 3/2008 |
| EP | 1 888 391 B1 | 2/2012 |
| JP | 8 119134 | 5/1996 |
| JP | 2003 312510 | 11/2003 |
| JP | 2008 1286 | 1/2008 |

OTHER PUBLICATIONS

Office Action issued on Apr. 25, 2012 in the corresponding German Application No. 11 2009 000 885.2 (with English Translation).

* cited by examiner

STEERING DEVICE FOR VEHICLE

BACKGROUND OF THE INVENTION

1. Field of the Invention

The invention relates to a steering device that is equipped with an electric motor so as to provide steering assist force for the pivoting operation of a steering handle.

2. Description of the Related Art

An electric power steering device is equipped with an electric motor so as to provide steering assist force for the pivoting operation of a steering handle, and adjusts the steering assist force by controlling the electrification of the electric motor. Such an electric power steering device is supplied with source power from a vehicle-mounted electric power source device. However, in the case where an abnormality occurs in the vehicle-mounted electric power source device, the electric power steering device cannot appropriately perform the control of the electric motor. Therefore, for example, an electric power steering device described in Japanese Patent Application Publication No. 2003-312510 (JP-A-2003-312510) is equipped with a construction that multiplies an assist command value by a gain that gradually lessens from 1 to 0 as the power source voltage of the vehicle-mounted electric power source device approaches a set value that is regarded as an abnormality. By this construction, it is intended to reduce the electric power consumption of the vehicle-mounted electric power source device and therefore maintain the steering assist function for a longer time.

Generally, in the electric power steering devices, the assist command value is computed so that the steering assist force increases as the vehicle speed becomes lower. Therefore, even with the construction that multiplies the assist command value by a gain commensurate with the power source abnormal level, a large amount of electric power is consumed from the vehicle-mounted electric power source device in the case where a static steering operation is performed. That is, the service life of the vehicle-mounted electric power source device is greatly reduced in exchange for obtaining easy or comfortable operation.

SUMMARY OF THE INVENTION

The invention provides a steering device for a vehicle that maintains the steering assist while securing a longest-possible service life of an electric power source device, even at the time of abnormality of the electric power source device.

A first aspect of the invention provides a vehicle steering device that includes a steering mechanism that steers a wheel upon steering operation of a steering handle, an electric motor that is supplied with source power from an electric power source device and that generates assist force that assists in the steering operation of the steering handle, steering torque detection means for detecting steering torque that a driver inputs to the steering handle, and motor control means that controls driving of the electric motor based on at least the steering torque detected by the steering torque detection means. This vehicle steering device further includes electric power abnormality detection means for detecting abnormality of source power supply capability of the electric power source device, and vehicle speed detection means for detecting vehicle speed. The motor control means includes output restriction means for enhancing output restriction of the electric motor if the vehicle speed detected by the vehicle speed detection means declines when the abnormality of the source power supply capability of the electric power source device is detected by the electric power abnormality detection means.

In this aspect of the invention, the steering torque detection means detects the steering torque that is input to the steering handle, and the motor control means controls the driving of the electric motor on the basis of at least the detected steering torque, so that a driver is assisted in the steering operation. The electric motor is supplied with source power from the electric power source device. The electric power abnormality detection means detects abnormality of the source power supply capability of the electric power source device. For example, the electric power abnormality detection means detects a decline in the source power supply capability of the electric power source device, or a decline in the power source voltage, etc. In the case where the abnormality of the source power supply capability of the electric power source device is detected, the output restriction means enhances the output restriction of the electric motor on the basis of the decline in the vehicle speed. That is, in the case where the vehicle speed declines, the degree of the restriction of the output of the electric motor is increased so that the electric motor does not operate at high output.

For example, the output restriction means makes the output restriction of the electric motor during low vehicle speeds greater than the output restriction of the electric motor during high vehicle speeds. In this case, the output of the electric motor is more greatly restricted during low vehicle speeds than during high vehicle speeds. Besides, the output restriction means may make the output restriction of the electric motor during stop of the vehicle greater than the output restriction of the electric motor during travel of the vehicle.

At the time of static steering operation, the electric power consumption of the electric motor becomes the greatest. According to the foregoing aspect of the invention, the output of the electric motor at the time of static steering operation is greatly restricted, so that the service life of the electric power source device can be most effectively increased. On the other hand, with regard to the steering operation during the travel of the vehicle, the electric power that the electric motor needs to consume is less the greater the vehicle speed. Besides, in the case where an emergency steering operation for avoidance of the contact with another vehicle, or the like, is performed, the need for the steering assist becomes higher the greater the vehicle speed, in light of safety. Therefore, according to the foregoing aspect, in the case where the vehicle speed is great, the output restriction of the electric motor is less, so that steering assist force can be obtained at the time of an emergency steering operation, and so that high degree of safety is achieved.

The output restriction means stores relation-connecting information that indicates relation of an output upper limit value of the electric motor with the vehicle speed detected by the vehicle speed detection means. The relation-connecting information is set so that if the vehicle speed declines, an output upper limit value of the electric motor declines. The output control means may also perform a control such that the output of the electric motor does not exceed the output upper limit value that is found based on the relation-connecting information.

In this construction, the output restriction means stores relation-connecting information that is set so as to lower the output upper limit value of the electric motor if the vehicle speed declines, and performs a control such that the output of the electric motor does not exceed the output upper limit value found on the basis of the relation-connecting information, whereby the output restriction of the electric motor is enhanced when the vehicle speed declines. That is, the relation of the output upper limit value of the electric motor with respect to the vehicle speed is pre-stored as relation-connecting information, and the output of the electric motor is controlled so as not to exceed the output upper limit value, by using the output upper limit value of the electric motor set with respect to the vehicle speed. Therefore, the output restriction of the electric motor can be securely performed. Incidentally, since the output of the electric motor can be estimated in the form of the electric power supplied to the electric motor, the relation-connecting information may also be about a relation of the upper limit value of the electric power supplied to the electric motor with respect to the vehicle speed. In such a case, the information may be provided so as to make such a setting that when the vehicle speed declines, the upper limit value of the electric power supplied to the electric motor is lowered.

When the vehicle comes to a stop after the vehicle speed decreases, the output restriction means may decrease the output upper limit value of the electric motor with elapse of time following the stop of the vehicle from the output upper limit value that is set based on the relation-connecting information in a case of the vehicle speed being substantially zero.

Considering the increasing of the service life of the electric power source device, it is desired to maximally restrict the output of the electric motor at the time of the static steering operation. However, if the output upper limit value of the electric motor is suddenly lowered to a final target value (e.g., zero) when the vehicle is decelerated to a stop, great discomfort will be caused to the driver. Therefore, according to the foregoing construction, a value that is decreased with elapse of time following the stop of the vehicle from the output upper limit value of the electric motor for zero vehicle speed that is set by the relation-connecting information is set as an output upper limit value of the electric motor. Therefore, the output upper limit value of the electric motor can be lowered to the final target value without causing great discomfort to the driver. For example, the output upper limit value of the electric motor can be lowered to zero.

When the vehicle starts from a stopped state, the output restriction means may gradually increase the output upper limit value of the electric motor with elapse of time following the start of the vehicle up to the output upper limit value that is set based on the relation-connecting information.

According to this construction, when the vehicle starts from a stopped state, the output upper limit value of the electric motor increases with elapse of time following the start of the vehicle, and finally increases to the output upper limit value corresponding to the vehicle speed set on the basis of the relation-connecting information. Therefore, the output upper limit value of the electric motor can be gradually increased from a low value set for the time of stop of the vehicle to a value that is set according to the vehicle speed, so that great discomfort is not caused to the driver.

The motor control means may include a motor drive circuit that drives the electric motor, and the output restriction means may control an upper limit of the electric power supplied from the electric power source device to the motor drive circuit so that output of the electric motor does not exceed the output upper limit value.

In this construction, the upper limit of the electric power supplied to the motor drive circuit is controlled in order to carry out the output restriction of the electric motor. Therefore, the control becomes simple.

The electric power source device may include a main electric power source that supplies source power to a plurality of electrical loads provided in the vehicle, including the electric motor, and a subsidiary electric power source that is connected in parallel with and between the main electric power source and the electric motor, and that stores electric power output by the main electric power source, and that assists in supplying source power to the electric motor by using the electric power stored. The electric power abnormality detection means may detect a state of being unable to supply source power from the main electric power source to the electric motor.

In this construction, the main electric power source and the subsidiary electric power source are provided as power sources that supply source power to the electric motor. Therefore, if the capability of the main electric power source of supplying source power to the electric motor is lost due to a broken wire or the like, source power can still be supplied to the electric motor from the subsidiary electric power source. However, if the steering assist control (control of the electric motor) is continued without any change by using the subsidiary electric power source, the steering assist obtained suddenly becomes null when there comes a situation in which the source power supply capability of the subsidiary electric power source is lost. In that case, great discomfort may be caused to the driver.

According to the foregoing construction, in the case where the electric power abnormality detection means detects the state of being unable to supply source power from the main electric power source to the electric motor, when the vehicle speed declines, the output restriction means performs the output restriction of the electric motor, so that the operation of the steering handle becomes heavy, and therefore the driver can be caused to recognize the abnormality in an early period. As a result, a favorable arrangement for repair of the failure can be expected.

A second aspect of the present invention provides a vehicle steering method for controlling output of an electric motor that is supplied with source power from an electric power source device and generates assist force that assists in an steering operation of a steering handle. The method includes detecting abnormality of source power supply capability of the electric power source supply device; and detecting a vehicle speed. The output of the electric motor is controlled so that output restriction of the electric motor is enhanced if the detected vehicle speed declines while the abnormality of the source power supply capability of the electric power source device is detected.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
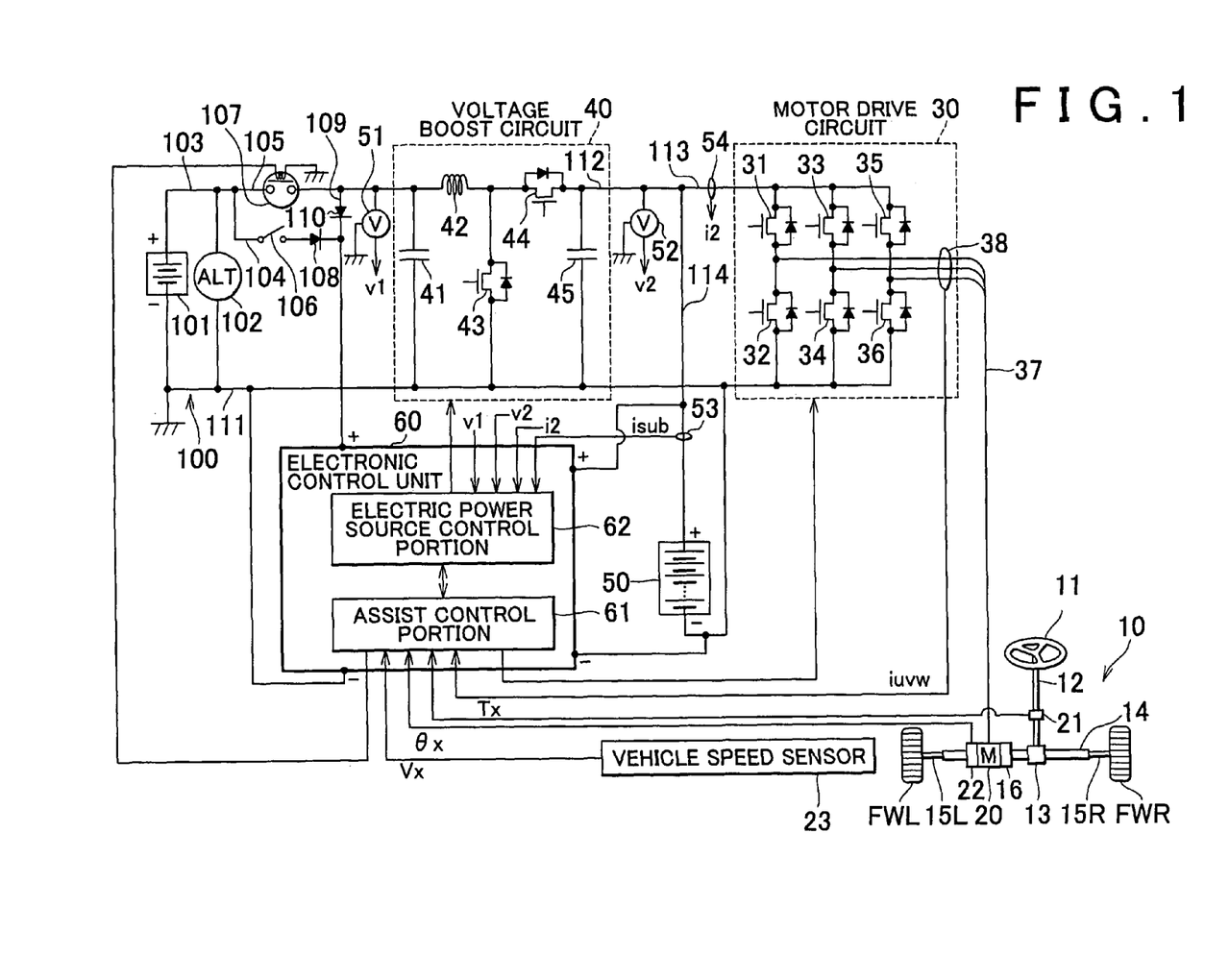
FIG. 1 is a general system construction diagram of an electric power steering device in accordance with an embodiment of the invention.

A steering device for a vehicle in accordance with an embodiment of the invention will be described hereinafter with reference to the drawings. FIG. 1 represents a general construction of an electric power steering device for a vehicle of a first embodiment.

This electric power steering device includes, as main portions, a steering mechanism 10 that steers steering road wheels according to the steering operation of a steering handle 11, an electric motor 20 assembled to the steering mechanism 10 to generate steering assist torque, a motor drive circuit 30 that drives the electric motor 20, a voltage boost circuit 40 that boosts the output voltage of a main electric power source 100 and thus supplies source power to the motor drive circuit 30, a subsidiary electric power source 50 connected in parallel with a power source supply circuit between the voltage boost circuit 40 and the motor drive circuit 30, and an electronic control unit 60 that controls the operation of the electric motor 20 and the voltage boost circuit 40.

The steering mechanism 10 is a mechanism for steering left and right front wheels FWL, FWR by rotationally operating the steering handle 11, and includes a steering shaft 12 that is connected at an upper end thereof to the steering handle 11 so as to rotate integrally with the steering handle 11. A pinion 13 is connected to a lower end of the steering shaft 12 so as to rotate integrally with the steering shaft. The pinion 13 meshes with rack teeth formed on a rack bar 14, thus forming a rack-and-pinion mechanism together with the rack bar 14. Knuckles (not shown) of the left and right front wheels FWL, FWR are steerably connected to two ends of the rack bar 14 via tie rods 15L, 15R. The left and right front wheels FWL, FWR are steered to left and right according to the displacement of the rack bar 14 in the direction of its own axis associated with the rotation of the steering shaft 12 about its own axis.

The electric motor 20 for the steering assist is assembled to the rack bar 14. A rotation shaft of the electric motor 20 is connected to the rack bar 14 via a ball screw mechanism 16 so as to be capable of transmitting mechanical power. Rotation of the rotation shaft gives steering force to the left and right front wheels FWL, FWR, thus assisting a driver in the steering operation. The ball screw mechanism 16 functions as a speed reducer and a rotary-linear motion converter, that is, transmits the motion of the electric motor 20 to the rack bar 14 while reducing the speed of the rotation of the electric motor 20 and converting the rotation into linear motion.

The steering shaft 12 is provided with a steering torque sensor 21. The steering torque sensor 21 outputs a signal commensurate with the steering torque that acts on the steering shaft 12 due to the pivoting operation of the steering handle 11. The value of steering torque detected by the signal output by the steering torque sensor 21 will be hereinafter termed the steering torque Tx. By the positive and negative signs of the steering torque Tx, the operating direction of the steering handle 11 is discerned. In this embodiment, the steering torque Tx caused when the steering handle 11 is steered in the right-hand direction is shown as a positive value, and the steering torque Tx caused when the steering handle 11 is steered in the left-hand direction is shown as a negative value. Therefore, when the magnitude of the steering torque Tx is discussed below, the magnitude of the absolute value thereof will be used.

The electric motor 20 is provided with a rotation angle sensor 22. This rotation angle sensor 22 is incorporated in the electric motor 20, and outputs a detection signal commensurate with the rotational angular position of a rotor of the electric motor 20. The detection signal from the rotation angle sensor 22 is used to calculate the rotation angle and the rotation angular velocity of the electric motor 20. In addition, the rotation angle of the electric motor 20 is proportional to the steering angle of the steering handle 11, and is therefore used as the steering angle of the steering handle 11 as well. Besides, the rotation angular velocity, which is a time derivative of the rotation angle of the electric motor 20, is proportional to the steering angular velocity of the steering handle 11, and is therefore used as the steering speed of the steering handle 11 as well. Hereinafter, the value of the steering angle of the steering handle 11 detected from the output signal of the rotation angle sensor 22 will be termed the steering angle $\theta x$, and the value of the steering angular velocity obtained by differentiating the steering angle $\theta x$ with respect to time will be termed the steering speed $\omega x$. The positive sign and the negative sign of the value of the steering angle $\theta x$ represent the steering angles in the rightward direction and the leftward direction, respectively, from the neutral position of the steering handle 11. In this embodiment, the neutral position of the steering handle 11 is shown by "0", and the steering angle in the rightward direction from the neutral position is shown by a positive value, and the steering angle in the leftward direction from the neutral position is shown by a negative value.

The motor drive circuit 30 is a three-phase inverter circuit constructed of six switching elements 31 to 36 which are each made up of a MOSFET. Concretely, a circuit formed by connecting a first switching element 31 and a second switching element 32 in series, a circuit formed by connecting a third switching element 33, and a fourth switching element 34 in series, a circuit formed by connecting a fifth switching element 35 and a sixth switching element 36 in series are interconnected in parallel, and a power source supply line 37 is led out from a line between two switching elements (31-32, 33-34, 35-36) of each of the series circuits.

A current sensor 38 is provided on the power source supply lines 37 extending from the motor drive circuit 30 to the electric motor 20. This current sensor 38 detects (measures) the electric current that flows separately for each phase, and outputs a detection signal corresponding to the detected electric current value to the electronic control unit 60. Hereinafter, the measured electric current value will be termed the motor current iuvw. Besides, this current sensor 38 will be termed the motor current sensor 38.

As for each of the switching elements 31 to 36, the gate thereof is connected to an assist control portion 61 (described later) of the electronic control unit 60, and the duty ratio is controlled by a PWM control signal from the assist control portion 61. As a result, the drive voltage of the electric motor 20 is adjusted to a target voltage. Incidentally, as shown by a circuit symbol in the diagram, each of the MOSFETs constituting the switching elements 31 to 36 has a parasitic diode as a part of its structure.

Next, a power source supply system of the electric power steering device will be described. An electric power source device of the electric power steering device includes the main electric power source 100, the voltage boost circuit 40 that boosts the output voltage of the main electric power source 100, the subsidiary electric power source 50 connected in parallel with and between the voltage boost circuit 40 and the motor drive circuit 30, and an electric power source control portion 62 that is provided in the electronic control unit 60 and that controls the voltage boosted by the voltage boost circuit 40.

The main electric power source 100 is constructed by interconnecting in parallel a main battery 101 that is a common vehicle-mounted battery having a rated output voltage of 12 V, and an alternator 102 having a rated output voltage of 14 V which generates electricity by rotation of the engine. Therefore, the main electric power source 100 constitutes a vehicle-mounted electric power source of a 14-V system.

The main electric power source 100 supplies source power to not only the electric power steering device but also other vehicle-mounted electrical loads, such as headlights and the like. A power source supplier line 103 is connected to a power source terminal (positive terminal) of the main battery 101, and a grounding line 111 is connected to a ground terminal thereof.

The power source supplier line 103 branches into a control system power source line 104 and a drive system power source line 105. The control system power source line 104 functions as a power source line for supplying source power only to the electronic control unit 60. The drive system power source line 105 functions as a power source line for supplying source power to both the motor drive circuit 30 and the electronic control unit 60.

An ignition switch 106 is connected to the control system power source line 104. A power source relay 107 is connected to the drive system power source line 105. This power source relay 107 turns on by a control signal from the assist control portion 61 of the electronic control unit 60, so as to form an electric power supply circuit for the electric motor 20. The control system power source line 104 is connected to the source positive terminal of the electronic control unit 60, and has a diode 108 in an intermediate portion thereof that is to the load side (the electronic control unit 60 side) of the ignition switch 106. The diode 108 is a back-flow prevention element whose cathode is provided on the electronic control unit 60 side and whose anode is provided on the main electric power source 100 side, and which allows current to pass only in the direction of power source supply.

From the drive system power source line 105, a linkage line 109 branches which connects to the control system power source line 104 at the load side of the power source relay 107. The linkage line 109 is connected to the electronic control unit 60 side of the connecting location at which the diode 108 is connected to the control system power source line 104. Besides, a diode 110 is connected to the linkage line 109. This diode 110 is provided with its cathode connected to the control system power source line 104 side, and its anode connected to the drive system power source line 105 side. Therefore, a circuit construction is formed in which source power can be supplied from the drive system power source line 105 to the control system power source line 104 via the linkage line 109, but cannot be supplied from the control system power source line 104 to the drive system power source line 105. The drive system power source line 105 and the grounding line 111 are connected to the voltage boost circuit 40. Besides, the grounding line 111 is also connected to a grounding terminal of the electronic control unit 60.

A voltage sensor 51 is provided on the drive system power source line 105 between the voltage boost circuit 40 and the power source relay 107. The voltage sensor 51 is provided for detecting a state of being unable to supply source power from the main electric power source 100 to the electric motor 20. The voltage sensor 51 detects (measures) the voltage between the drive system power source line 105 and the grounding line 111, and outputs a signal of detection to the electric power source control portion 62, and, via the electric power source control portion 62, to the assist control portion 61. Hereinafter, this voltage sensor 51 will be termed the first voltage sensor 51, and the voltage value detected thereby will be termed the main power source voltage v1.

The voltage boost circuit 40 is constructed of a capacitor 41 provided between the drive system power source line 105 and the grounding line 111, a voltage-boosting coil 42 connected in series to the drive system power source line 105 on the load side of the connecting point of the capacitor 41, a first voltage-boosting switching element 43 connected between the drive system power source line 105 on the load side of the voltage-boosting coil 42 and the grounding line 111, a second voltage-boosting switching element 44 connected in series to the drive system power source line 105 on the load side of the connecting point of the first voltage-boosting switching elements 43, and a capacitor 45 connected between the drive system power source line 105 on the load side of the second voltage-boosting switching element 44 and the grounding line 111. A boosted-voltage power source line 112 is connected to the secondary side of the voltage boost circuit 40.

In this embodiment, the voltage-boosting switching elements 43, 44 are MOSFETs; however, other types of switching elements may also be used as the voltage-boosting switching elements 43, 44. Besides, as shown by circuit symbols in the diagram, each of the MOSFETs constituting the voltage-boosting switching elements 43, 44 has a parasitic diode as a part of its structure.

As for the voltage boost circuit 40, the voltage boost is controlled by the electric power source control portion 62 of the electronic control unit 60. The electric power source control portion 62 outputs pulse signals of a predetermined frequency to the gates of the first and second voltage-boosting switching, elements 43, 44 to turn on and off the two switching elements 43, 44 so that the source power supplied from the main electric power source 100 is boosted in voltage and a predetermined output voltage is generated on the boosted-voltage power source line 112. In this case, the first and second voltage-boosting switching elements 43, 44 are controlled so that their on-off actions are opposite to each other. The voltage boost circuit 40; in operation, has the first voltage-boosting switching element 43 on and the second voltage-boosting switching element 44 off to let current flow through the voltage-boosting coil 42 only for a short time so that electric power is accumulated in the voltage-boosting coil 42, and then immediately have the first voltage-boosting switching element 43 off and the second voltage-boosting switching element 44 on so that the electric power accumulated in the voltage-boosting coil 42 is output.

The output voltage of the second voltage-boosting switching element 44 is smoothed by the capacitor 45. Therefore, a stable boosted-voltage source power is output from the boosted-voltage power source line 112. In this case, a plurality of capacitors of different frequencies may be connected in parallel to improve the smoothing characteristic. Besides, the capacitor 41 provided on the input side of the voltage boost circuit 40 removes the noise that would otherwise go to the main electric power source 100 side.

The boosted voltage (output voltage) of the voltage boost circuit 40 can be adjusted, for example, in the range of 20 V to 50 V, by the control of the duty ratio (PWM control) of the first and second voltage-boosting switching elements 43, 44. Incidentally, as the voltage boost circuit 40, it is permissible to use a general-purpose DC-DC converter.

The boosted-voltage power source line 112 branches into a boosted voltage drive line 113 and a charge/discharge line 114. The boosted voltage drive line 113 is connected to a power source input portion of the motor drive circuit 30. The charge/discharge line 114 is connected to a positive terminal of the subsidiary electric power source 50.

The subsidiary electric power source 50 is an electric storage device that stores electric power input from the voltage boost circuit 40, and that assists the main electric power source 100 by supplying source power to the motor drive circuit 30 when the motor drive circuit 30 needs a large amount of electric power. Besides, when the main electric power source 100 fails (loses its capacity of supplying source power), the subsidiary electric power source 50 is used so as to singly supply source power to the motor drive circuit 30. Therefore, the subsidiary electric power source 50 is constructed by connecting a plurality of electric storage cells in series so that a voltage corresponding to the boosted voltage of the voltage boost circuit 40 can be maintained. A grounding terminal of the subsidiary electric power source 50 is connected to the grounding line 111. As this subsidiary electric power source, it is permissible to use, for example, a capacitor (electric double layer capacitor).

The subsidiary electric power source 50 supplies source power also to the electronic control unit 60. When the source power supply from the main electric power source 100 to the electronic control unit 60 cannot be performed well, the subsidiary electric power source 50 supplies source power to the electronic control unit 60, in place of the main electric power source 100. Incidentally, the electronic control unit 60 has a voltage-lowering circuit (DC/DC converter, not shown) that lowers the voltage of the source power supplied from the subsidiary electric power source 50 and that is built in a power-receiving portion. Using this voltage-lowering circuit, the electronic control unit 60 adjusts the voltage to a proper voltage.

A voltage sensor 52 is provided on the output side of the voltage boost circuit 40. The voltage sensor 52 detects the voltage between the boosted-voltage power source line 112 and the grounding line 111, and outputs a signal commensurate with the detected value to the electric power source control portion 62. In this circuit construction, since the boosted-voltage power source line 112 and the charge/discharge line 114 are connected, the measurement value measured by the voltage sensor 52 is the higher voltage value of the output voltage (boosted voltage) of the voltage boost circuit 40 and the output voltage (power source voltage) of the subsidiary electric power source 50. Hereinafter, the voltage sensor 52 will be termed the second voltage sensor 52, and the voltage value detected thereby will be termed the output power source voltage v2.

Besides, the boosted voltage drive line 113 is provided with a current sensor 54 that detects the current flowing through the motor drive circuit 30. The current sensor 54 is connected to the electric power source control portion 62 of the electronic control unit 60, and outputs a signal that shows the measured output current i2, to the electric power source control portion 62. Hereinafter, the current sensor 54 will be termed the output current sensor 54.

Besides, the charge/discharge line 114 is provided with a current sensor 53 that detects the current flowing through the subsidiary electric power source 50. The current sensor 53 is connected to the electric power source control portion 62 of the electronic control unit 60, and outputs a signal that shows the measured charge/discharge current isub, to the electric power source control portion 62. The current sensor 53 discriminates the directions of current, that is, the charge current that flows from the voltage boost circuit 40 to the subsidiary electric power source 50, and the discharge current that flows from the subsidiary electric power source 50 to the motor drive circuit 30, and measures the magnitude thereof. The charge/discharge current isub is represented by a positive value when flowing as a charge current, and is represented by a negative value when flowing as a discharge current. Hereinafter, the current sensor 53 will be termed the charge/discharge current sensor 53, and the current value detected thereby will be termed the actual charge/discharge current isub.

The electronic control unit 60 has, as a main portion, a microcomputer that has a built-in memory and the like. The functions of the electronic control unit 60 are roughly divided into the assist control portion 61 and the electric power source control portion 62. The assist control portion 61 is connected to the steering torque sensor 21, the rotation angle sensor 22, the motor current sensor 38, and a vehicle speed sensor 23, and receives inputs of sensor signals that show the steering torque Tx, the steering angle θx, the motor current iuvw, and the vehicle speed Vx. The assist control portion 61, on the basis of these sensor signals, outputs a PWM control signal to the motor drive circuit 30 to control the driving of the electric motor 20 and therefore assist the driver in the steering operation.

The electric power source control portion 62 controls the charging and discharging of the subsidiary electric power source 50 by performing the voltage boost control of the voltage-boost circuit 40. The electric power source control portion 62 is connected to the first voltage sensor 51, the second voltage sensor 52, the charge/discharge current sensor 53, and the output current sensor 54, and receives inputs of sensor signals that show the main power source voltage v1, the output power source voltage v2, the actual charge/discharge current isub, and the output current i2. On the basis of these sensor signals, the electric power source control portion 62 outputs a PWM control signal to the voltage boost circuit 40 so that the state of charge of the subsidiary electric power source 50 reaches a target state of charge. The voltage boost circuit 40 changes the boosted voltage, that is, the output voltage of the circuit 40, by controlling the duty ratios of the first and second voltage-boosting switching elements 43, 44 in accordance with the input PWM control signal. Incidentally, the electric power source control portion 62 stops the voltage boost operation of the voltage boost circuit 40 when a fail of the main electric power source 100 has been detected.

The assist control portion 61 and the electric power source control portion 62 give and receive information to and from each other. For example, information acquired by the electric power source control portion 62 (the main power source voltage v1, the output power source voltage v2, the actual charge/discharge current isub, and the output current i2) is supplied to the assist control portion 61.

Generally, the electric power steering device needs large amounts of electric power at the time of static steering operation, or at the time of operating the steering handle at low vehicle speed, as can be understood from a steering assist control described below. However, it is not preferable to increase the capacity of the main electric power source 100 in preparation for a temporary large electric power consumption. Therefore, the electric power steering device of this embodiment is equipped with the subsidiary electric power source 50 that supplements the source power supply at the time of temporary large electric power consumption, instead of an increased capacity of the main electric power source 100. Besides, in order to efficiently drive the electric motor 20, a system that includes the voltage boost circuit 40, and supplies voltage-boosted power to the motor drive circuit 30 and the subsidiary electric power source 50 is constructed.

By the way, it sometimes happens that the source power cannot be supplied from the main electric power source 100 to the electric motor 20. Examples of the causes of this incident include a failure of the power source relay 107, a break of the drive system power source line 105, a bad connector connection of the power source line, etc. In such a case, the electric power steering device of this embodiment continues the steering assist control by using only the subsidiary electric power source 50. However, since there is a limit to the electric power amount that can be supplied from the subsidiary electric power source 50, there is a need to efficiently use the electric power that the subsidiary electric power source 50 holds, by restraining the output (assist force) of the electric motor 20. However, if the motor output is sharply restrained, the steering assist force will sharply change, astonishing the driver or causing considerably uncomfortable feeling to the driver. Therefore, in this embodiment, when the main electric power source 100 is abnormal, the motor output is restricted in such a manner that discomfort is not caused to the driver, and by taking safety into account.

With regard to the static steering operation or the steering operation at low vehicle speeds, the need for the steering assist is low if amenity is not taken into account. On the other hand, with regard to the steering operation at high vehicle speeds, the need for the steering assist is high if safety is taken into account. For example, in the case where an emergency steering operation is performed for avoidance of the contact with another vehicle, or the like, the steering assist is effective. Taking into these circumstances into account, the electric power steering device of this embodiment switches the steering assist control in accordance with whether the main electric power source 100 is normal or abnormal.

Figure 2:
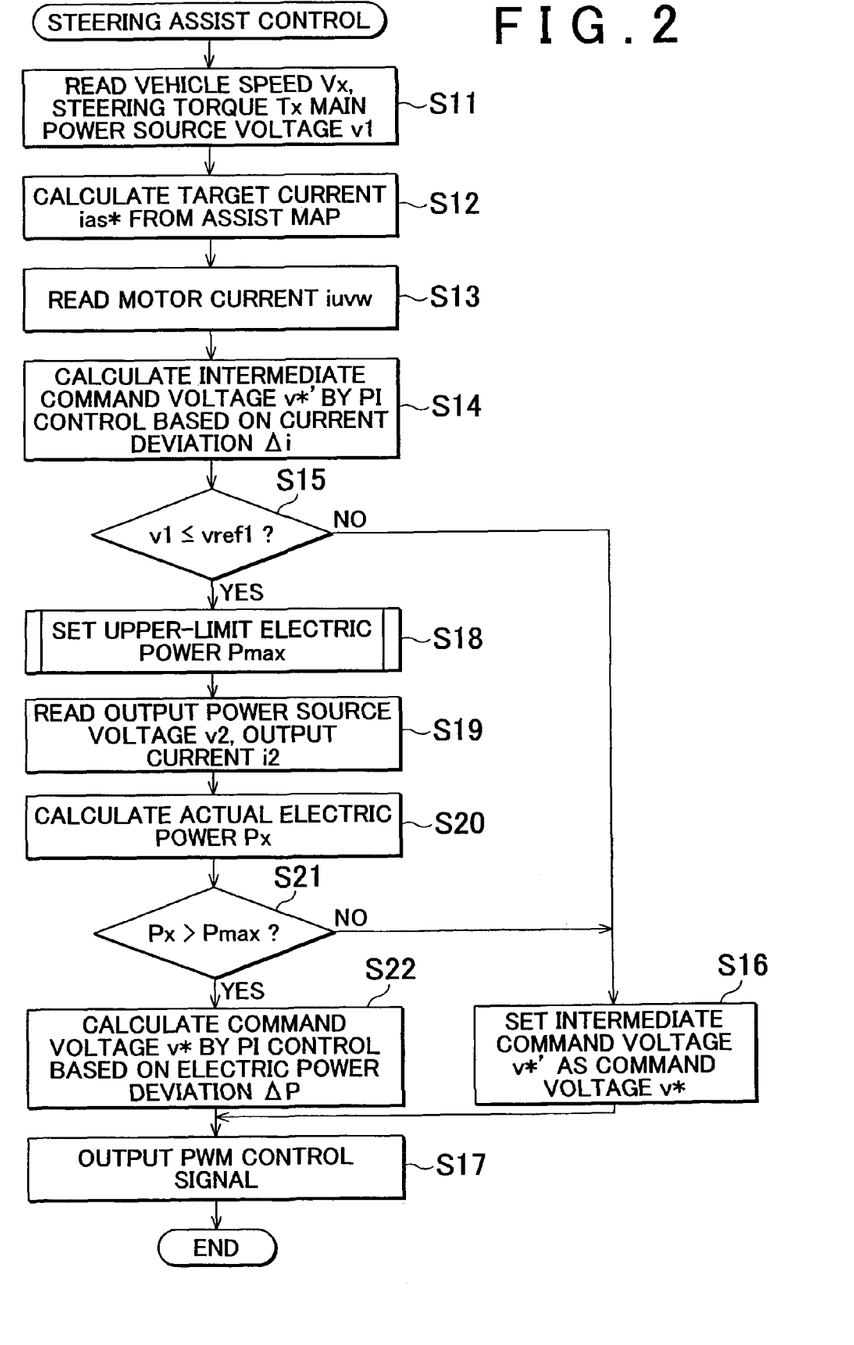
FIG. 2 is a flowchart representing a steering assist control routine in accordance with an embodiment.

Herein, the steering assist control process performed by the assist control portion 61 of the electronic control unit 60 will be described. FIG. 2 represents a steering assist control routine that is carried out by the assist control portion 61. The steering assist control routine is stored as a control program in the ROM of the electronic control unit 60, and is started upon the turning-on of the ignition switch 106, and is repeatedly executed at every predetermined short cycle period.

When the control routine is started, the assist control portion 61 firstly in step S11 reads the vehicle speed Vx detected by the vehicle speed sensor 23, the steering torque Tx detected by the steering torque sensor 21, and the main power source voltage v1 detected by the first voltage sensor.

Figure 3:
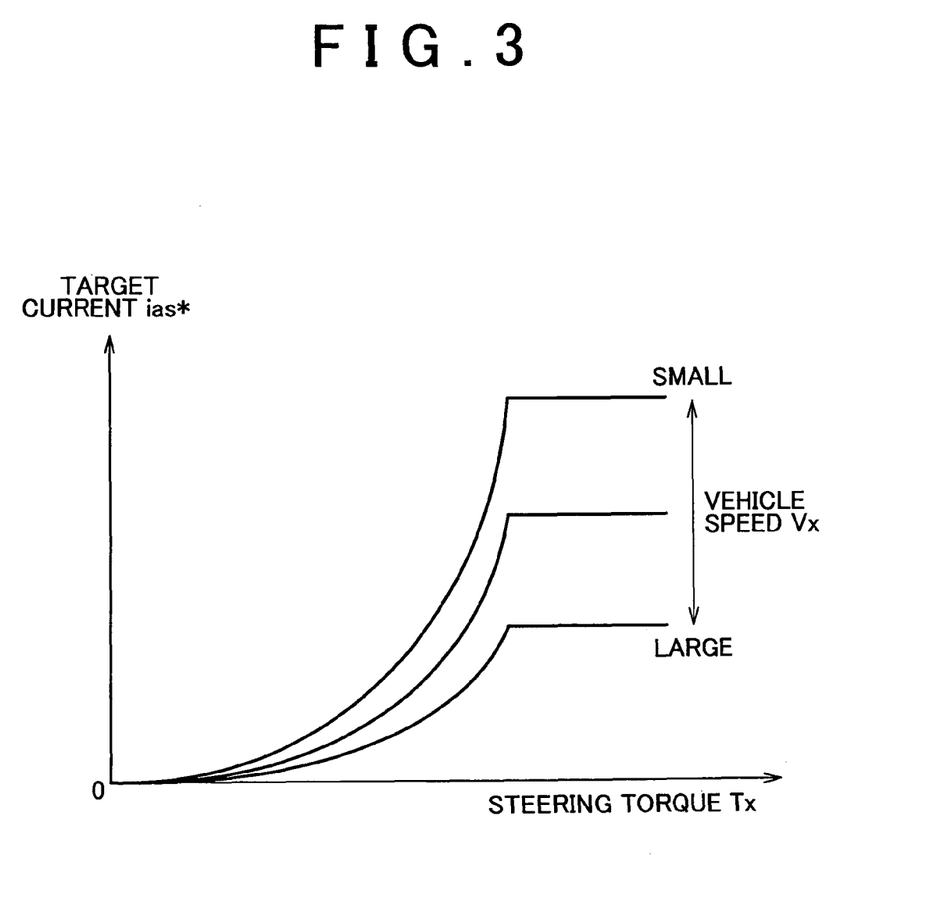
FIG. 3 is a characteristic diagram representing an assist map in accordance with an embodiment.

Subsequently in step S12, the assist control portion 61 calculates a target current ias* of the electric motor 20 that corresponds to the vehicle speed Vx and the steering torque Tx, with reference to the assist map. The assist map is a reference map for setting a target current value ias* of the electric motor on the basis of the vehicle speed Vx and the steering torque Tx, as shown in FIG. 3, and is stored in the memory of the electronic control unit 60. The assist map sets the target current value ias* so that the target value increases with increases in the steering torque Tx, and changes the relation between the steering torque Tx and the target current value ias* according to the vehicle speed Vx as well so as to set the target current value ias* at a value that is larger the lower the vehicle speed Vx becomes. Incidentally, the assist map shown in FIG. 3 represents the characteristic of the target current value ias* with respect to the steering torque Tx in the rightward direction. As for the characteristic thereof in the leftward direction, merely the direction is opposite, and there is no difference in terms of absolute value from the characteristic shown in FIG. 3.

The target current ias* of the electric motor 20 corresponds to the target torque of the electric motor 20. Therefore, in order to factor in the compensation torque based on the steering angle θx, the steering speed ωx, etc., the target current ias* may be corrected by a corresponding amount. For example, the target current ias* may be corrected to a target value that has factored in an amount corresponding to a compensation torque that is the sum of the returning force of the steering shaft 12 toward a basic position which increases in proportion to the steering angle θx, and a back torque that corresponds to the resisting force against the rotation of the steering shaft 12 which increases in proportion to the steering speed ωx. For this calculation, the rotation angle (corresponding to the steering angle θx of the steering handle 11) of the electric motor 20 detected by the rotation angle sensor 22 is input to the assist control portion 61. Besides, the steering speed ωx is found by differentiating the steering angle θx of the steering handle 11 with respect to time.

Next, in step S13, the assist control portion 61 reads from the motor current sensor 38 the motor current iuvw that flows through the electric motor 20. Subsequently in step S14, the assist control portion 61 feeds back the motor current iuvw, and calculates a deviation Δi of this motor current iuvw from the target current ias* having been calculated, and calculates an intermediate command voltage v*' by a PI control (proportional-plus-integral control) based on the deviation Δi.

Subsequently in step S15, the assist control portion 61 determines whether or not the main power source voltage v1 detected by the first voltage sensor 51 is less than or equal to a main electric power source fail criterion voltage vref1. The main electric power source fail criterion voltage vref1 is a set voltage for determining the presence/absence of a fail of the main electric power source 100, and is pre-stored in the ROM of the electronic control unit 60, or the like. The process of step S15 that the assist control portion 61 performs may be regarded as electric power abnormality detection means in the invention.

If in step S15 the answer is "NO", that is, it is determined that the main electric power source 100 has not failed, the process proceeds to step S16, in which the assist control portion 61 sets as a command voltage v* the intermediate command voltage v*' calculated in step S14.

Then, in step S17, the assist control portion 61 outputs the PWM control signal commensurate with the command voltage v* to the motor drive circuit 30. After that, the assist control portion 61 temporarily ends the control routine. This control routine is repeatedly executed at every predetermined short cycle period. Therefore, through the execution of the control routine, the duty ratios of the switching elements 31 to 36 of the motor drive circuit 30 are controlled so that a desired steering assist force according to the driver's steering operation is obtained.

Incidentally, the foregoing feedback control of the electric motor 20 is performed by a vector control that is represented by a two-phase d-q-axis coordinate system in which the q axis represents the rotating direction of the electric motor 20 and the d axis represents the direction orthogonal to the rotating direction. Therefore, the assist control portion 61 is equipped with a 3-phase/2-phase coordinate converter (not shown) that converts the three-phase motor current iuvw detected by the motor current sensor 38 into values in the d-q-axis coordinate system. Using the 3-phase/2-phase coordinate converter, the assist control portion 61 converts the motor current iuvw into the d-axis current Id and the q-axis current Iq. Besides, in the setting of a target current ias*, too, the assist control portion 61 calculates a target current (Id*, Iq*) in the d-q-axis coordinate system. In this case, the q-axis current that causes the electric motor 20 to generate torque is set as a target current ias* from the assist map. Besides, in order to calculate a three-phase voltage command value (command voltage v*) that corresponds to the deviation (Id*-Id, Iq*-Iq), the assist control portion 61 is equipped with a 2-phase/3-phase coordinate conversion portion (not shown). Using the 2-phase/3-phase coordinate conversion portion, the assist control portion 61 calculates a three-phase command voltage v*.

In this embodiment, for the sake of easy and simple description, the representations in the d-q-axis coordinate system are not used, and the target current is represented simply as ias*, and the motor current detected by the motor current sensor 38 is represented as iuvw.

Description will be returned to the steering assist control shown in FIG. 2. If the main electric power source 100 is normal (NO in S15), the foregoing process (S11 to S17) is repeated. If the main electric power source 100 fails and the main power source voltage v1 declines to or below the main electric power source fail criterion voltage vref1, the answer to the determination in step S15 becomes "YES", and the process starting with step S18 is performed.

Figure 4:
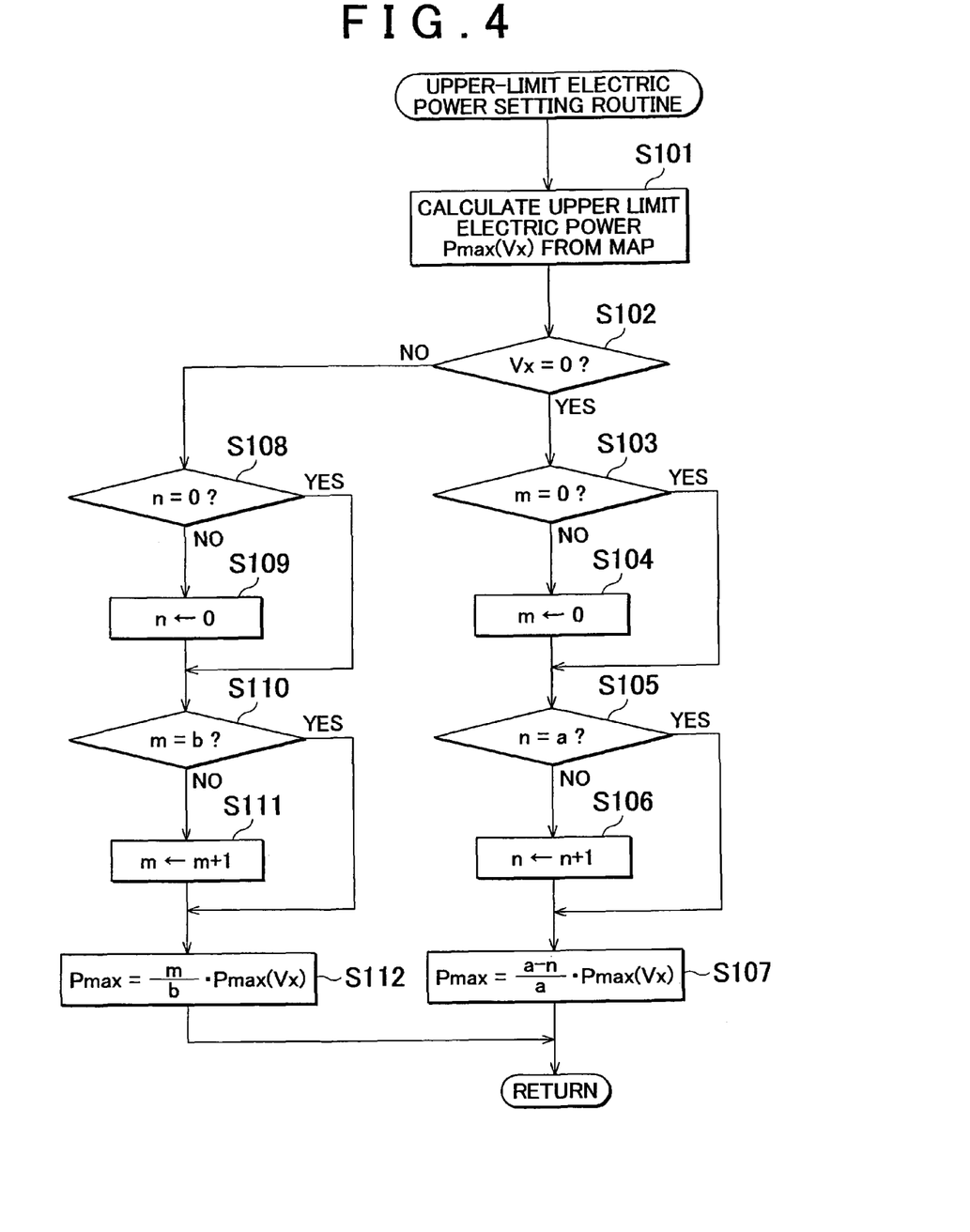
FIG. 4 is a flowchart representing an upper-limit electric power setting routine in accordance with an embodiment.

In step S18, the assist control portion 61 performs an upper-limit electric power setting process for the electric motor 20. This process will be described in detail with reference to FIG. 4. FIG. 4 is a flowchart representing an upper-limit electric power setting routine. This upper-limit electric power setting routine is incorporated as the process of step S18 in the steering assist control routine, and is therefore executed at every cycle period at which the steering assist control routine is repeatedly performed.

If the main electric power source 100 has failed, the assist control portion 61 sets an upper limit of the output of the electric motor 20. The output of the electric motor 20 can be represented by a product of the steering assist force and the steering speed ωx. The output of the electric motor 20 can be estimated as an electric power supplied as source power to the motor drive circuit 30 that drives the electric motor 20. Therefore, in this embodiment, an upper limit of the electric power supplied as the source power to the motor drive circuit 30 is set for the purpose of easily setting the upper limit of the output of the electric motor 20.

When the upper-limit electric power setting routine is started, the assist control portion 61 firstly in step S101 calculates an upper-limit electric power Pmax(Vx) from an upper-limit electric power setting map. The upper-limit electric power setting map is provided for setting an upper limit value of the electric power to be supplied to the electric motor 20 according to the vehicle speed Vx as shown by a thick line in FIG. 5, and is stored in the memory of the electronic control unit 60. As can be understood from the characteristic of this upper-limit electric power setting map, an upper-limit electric power Pmax(Vx) that increases with increases in the vehicle speed is set in a range of the vehicle speed Vx from zero to a reference vehicle speed V0. In other words, the upper-limit electric power Pmax(Vx) that decreases with decreases in the vehicle speed is set. Besides, if the vehicle speed Vx exceeds a reference vehicle speed V0, a fixed upper-limit electric power Pmax(Vx) is set.

Figure 5:
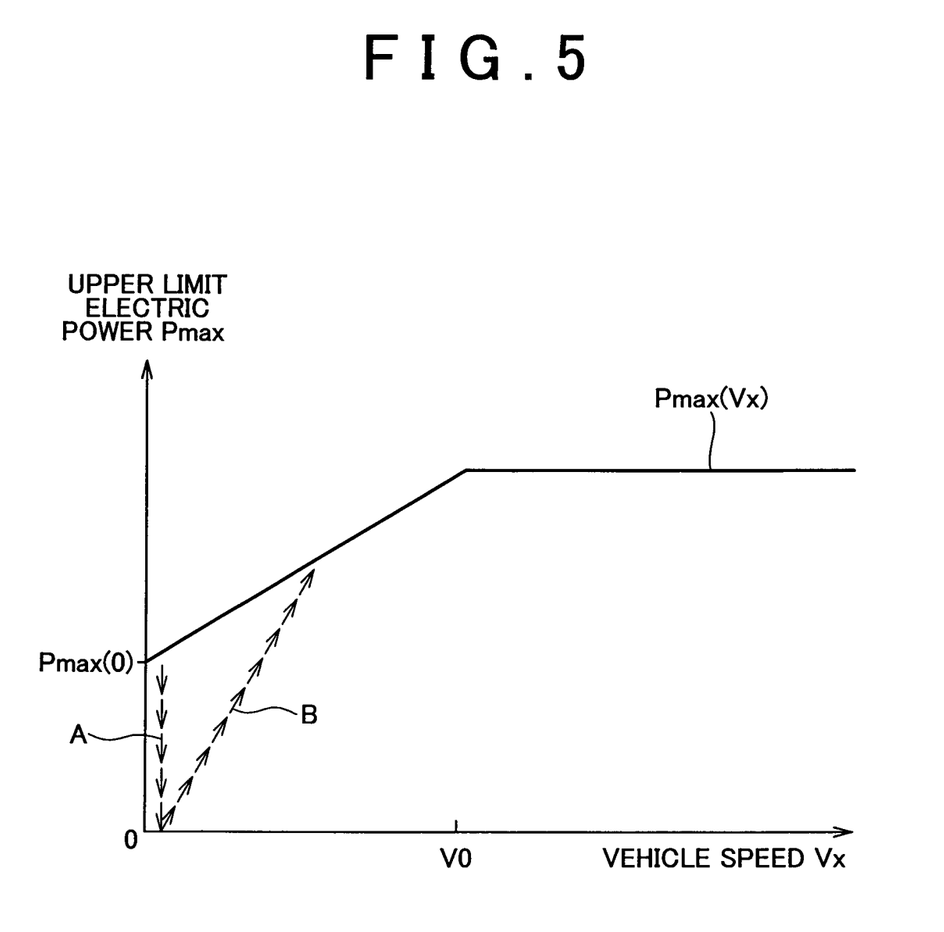
FIG. 5 is a characteristic diagram representing an upper-limit electric power setting map in accordance with an embodiment.

The output of the electric motor 20 can be estimated as the electric power that is supplied to the electric motor 20. Therefore, in this upper-limit electric power setting map, a relation between the vehicle speed Vx and the output upper limit value of the electric motor 20 is set and stored. Besides, as for the setting of the upper-limit electric power Pmax(Vx), it is not altogether necessary to use the map. For example, the upper-limit electric power Pmax(Vx) may be set by using information (e.g., a function) that allows the upper-limit electric power Pmax(Vx) to be deduced from the vehicle speed Vx.

After setting the upper-limit electric power Pmax(Vx) from the vehicle speed Vx, the assist control portion 61 determines in step S102 whether or not the vehicle speed Vx is zero (Vx=0). If the vehicle speed Vx is zero (YES at S102), the process proceeds to step S103, in which the assist control portion 61 checks whether or not a vehicle start timer count value m is zero (m=0). If the vehicle start timer count value m is not zero, the assist control portion 61 clears the vehicle start timer count value m to zero in step S104. This vehicle start timer count value m is for counting the elapsed time following the start of the vehicle from a stopped state (Vx=0). Therefore, the process of step S103, 104 is a process of resetting the timer count value in preparation for the standing start of the vehicle.

Subsequently in step S105, the assist control portion 61 determines whether or not the stop timer count value n has reached a reference value a. If the stop timer count value n has not reached the reference value a, the process proceeds to step S106, in which the assist control portion 61 increments the stop timer count value n by value 1. This stop timer count value n is for counting the elapsed time following a stop of the vehicle. If the stop timer count value n has reached the reference value a (YES in S105), the process of step S106 is skipped. Incidentally, the vehicle start timer count value m and the stop timer count value n are set at value 0 when the assist control routine is started.

Subsequently in step S107, the assist control portion 61 calculates a final upper-limit electric power Pmax using the following equation (1):

$$Pmax=((a-n)/a)\cdot Pmax(Vx) \quad (1)$$

After calculating the final upper-limit electric power Pmax in step S107, the assist control portion 61 exits the upper-limit electric power setting routine, and proceeds to step S19 in the steering assist control routine. The upper-limit electric power setting routine is repeatedly executed at the same cycle period of the steering assist control routine. Therefore, steps S105 to S107 form a process that gradually reduces the upper-limit electric power Pmax from the Pmax(Vx) according to the elapsed time following the stop of the vehicle.

Immediately after the vehicle stops running, the set stop timer count value n is value 0, and Pmax(Vx) is directly set as a final upper-limit electric power Pmax. While the vehicle is in the stopped state, the stop timer count value n increases every time the upper-limit electric power setting routine is repeated. Therefore, the finally set upper-limit electric power Pmax is lessened by 1/a of the upper-limit electric power Pmax(Vx) at a time. Then, as the stop timer count value n reaches the reference value a, the upper-limit electric power Pmax reaches zero.

In FIG. 5, changes in the upper-limit electric power Pmax following the stop of the vehicle are represented by arrows A. As shown in FIG. 5, the upper-limit electric power Pmax declines from Pmax(0) occurring immediately following the stop of the vehicle, with the elapsed time following the stop of the vehicle, and then finally reaches zero. The rate of decrement of the upper-limit electric power Pmax may be set at a desired value from the control cycle period of the upper-limit electric power setting routine and the reference value a.

Description will be returned to the upper-limit electric power setting routine shown in FIG. 4. If in step S102 it is determined that the vehicle speed Vx is not zero, the assist control portion 61 checks in step S108 whether or not the stop timer count value n is zero (n=0). If the stop timer count value n is not zero, the assist control portion 61 clears the stop timer count value n to zero in step S109. Therefore, the process of steps S108, S109 is a process of resetting the timer count value in preparation for a stop of the vehicle.

Subsequently in step S110, the assist control portion 61 determines whether or not the vehicle start timer count value m has reached a reference value b. If the vehicle start timer count value m has not reached the reference value b, the assist control portion 61 increments the vehicle start timer count value m by value 1 in step S111. If the vehicle start timer count value m has reached the reference value b (YES in S110), the process of step S111 is skipped.

Subsequently in step S112, the assist control portion 61 calculates a final upper-limit electric power Pmax by using the following equation (2):

$$P_{max} = (m/b) \cdot P_{max}(Vx) \quad (2)$$

After calculating the final upper-limit electric power Pmax in step S112, the assist control portion 61 exits the upper-limit electric power setting routine, and proceeds to step S19 in the steering assist control routine. Therefore, the process of steps S110 to S112 is a process of progressively increasing the upper-limit electric power Pmax from zero to the upper-limit electric power Pmax(Vx) with the elapsed time following the standing start of the vehicle.

Immediately after the vehicle starts running, the set vehicle start timer count value m is value 0, and the upper-limit electric power Pmax is set at zero. Then, while the vehicle is running, the vehicle start timer count value m is incremented every time the upper-limit electric power setting routine is repeated. Therefore, the proportion of the upper-limit electric power Pmax to the upper-limit electric power Pmax(Vx) increases by 1/b at a time. Then, as the vehicle start timer count value m reaches the reference value b, the upper-limit electric power Pmax becomes equal to the upper-limit electric power Pmax(Vx).

In FIG. 5, changes in the upper-limit electric power Pmax that follow the standing start of the vehicle are represented by arrows B. As shown in FIG. 5, the upper-limit electric power Pmax increases from zero with the elapsed time following the standing start, and finally reaches the upper-limit electric power Pmax(Vx). The rate of increment of the upper-limit electric power Pmax may be set at a desired value from the control cycle period of the upper-limit electric power setting routine and the reference value b.

The assist control portion 61, after setting the upper-limit electric power Pmax by the upper-limit electric power setting routine, proceeds to step S19 in steering assist control routine. In step S19, the assist control portion 61 reads the output power source voltage v2 detected by the second voltage sensor 52 and the output current i2 detected by the output current sensor 54.

Subsequently in step S20, the assist control portion 61 calculates an electric power consumed by the electric motor 20 (termed the actual electric power Px) from a product (v2×i2) of the output power source voltage v2 and the output current i2.

Subsequently in step S21, the assist control portion 61 determines whether or not the actual electric power Px is greater than the upper-limit electric power Pmax. As the upper-limit electric power Pmax, the value set in step S18 is used. If the actual electric power Px is not greater than the upper-limit electric power Pmax (NO in S21), the process proceeds to step S16, in which the assist control portion 61 sets the intermediate command voltage v*' calculated previously in step S14, as a command voltage v*. On the other hand, if the actual electric power Px is greater than the upper-limit electric power Pmax (YES in S21), the process proceeds to step S22, in which the assist control portion 61 calculates a deviation ΔP between the actual electric power Px and the upper-limit electric power Pmax, and calculates a command voltage v* by the PI control (proportional-plus-integral control) based on the deviation ΔP. That is, the assist control portion 61 feeds back the actual electric power Px, and calculates the command voltage v* such that the deviation ΔP between the actual electric power Px and the upper-limit electric power Pmax becomes zero. In this case, a restriction is imposed such that the command voltage v* does not decline below the intermediate command voltage v*' and the actual electric power Px does not exceed the upper-limit electric power Pmax.

After the command voltage v* is calculated in this manner, the assist control portion 61 outputs a PWM control signal commensurate with the command voltage v* to the motor drive circuit 30 in step S17, and then temporarily ends the control routine. This control routine is repeatedly executed at every predetermined short cycle period. Therefore, by execution of the control routine, the duty ratios of the switching elements 31 to 36 of the motor drive circuit 30 are controlled so that the electric power consumption of the electric motor 20 is restricted so as not to exceed the upper-limit electric power Pmax. Thus, the upper limit of the output of the electric motor 20 is restricted.

According to the foregoing electric power steering device of the embodiment, in the case where the main electric power source 100 fails, the steering assist control can be continued by efficiently using the electric power of the subsidiary electric power source 50. That is, when the vehicle is running, the device performs a control so as to obtain steering assist force, while imposing an upper-limit restriction on the output of the electric motor 20. When the vehicle is in the stopped state, the device performs a control such that steering assist force is not generated. In this manner, a longer service life of the subsidiary electric power source 50 can be pursued.

At the time of a static steering operation, the power consumption of the electric motor 20 becomes the largest. Therefore, in the case where the steering assist is stopped at the time of a static steering operation, the service life of the subsidiary electric power source 50 can be most effectively elongated. On the other hand, with regard the steering operation during the running of the vehicle, the power consumption of the electric motor 20 can be made less the greater the vehicle speed becomes. Besides, during the running of the vehicle, the need for the steering assist becomes higher the greater the vehicle speed becomes, in light of safety, for example, in the case where an emergency steering operation is performed for avoidance of the contact with another vehicle, or the like.

Therefore, in this embodiment, at the time of abnormality, such as when the main electric power source 100 fails, or the like, safety is secured by increasing the upper-limit electric power Pmax of the electric motor 20 with the heightening vehicle speed Vx as shown in the map of FIG. 5, and the power consumption of the subsidiary electric power source 50 is restrained by reducing the upper-limit electric power Pmax of the electric motor 20 with the decreasing vehicle speed Vx. Therefore, good balance between safety and the service life of the subsidiary electric power source 50 can be kept.

Furthermore, the steering assist is not stopped immediately after the vehicle stops, but the upper-limit electric power Pmax of the electric motor 20 is gradually lowered after the stop of the vehicle. Finally, the steering assist is stopped. Therefore, the steering assist characteristic does not sharply change. Therefore, the device does not astonish the driver, or does not cause considerably uncomfortable feeling to the driver.

Besides, even when the vehicle is to be started, the upper-limit electric power Pmax of the electric motor 20 is gradually increased from zero to the upper limit current Pmax(Vx), so that the steering assist characteristic does not sharply change, and does not astonish the driver, or does not cause considerably uncomfortable feeling to the driver.

Besides, in the case where the main electric power source 100 fails, this abnormality can be caused to be recognized by the driver since the steering handle operation becomes heavy due to the restriction of the output of the electric motor 20.

Therefore, the driver can cope with the failure, such as, a request for a repair or the like, at an early stage after the fail of the main electric power source 100 is detected. For example, even if the main electric power source 100 fails, the steering assist control can be continued by using the subsidiary electric power source 50 as it has been. In such a case, the capacity of the subsidiary electric power source 50 of supplying source power may be lost, the provision of the steering assist sharply discontinues, giving rise to a possibility of causing considerably uncomfortable feeling to the driver. On the other hand, in this embodiment, an event where such an uncomfortable feeling is caused to the driver or the like is substantially prevented by restricting the output of the electric motor 20 from the time point of the detection of a failure of the main electric power source 100.

Besides, in the embodiment, to perform the output restriction of the electric motor 20, the actual electric power Px is calculated by using the electric power supplied to the motor drive circuit 30, that is, the product (v2×i2) of the direct-current output power source voltage v2 and the output current i2. Therefore, the calculation is very simple. Besides, since the control of restricting the output of the electric motor 20 is incorporated into the steering assist control, and is performed by the PWM control of the motor drive circuit 30, this embodiment does not needs any special control circuit for restricting the motor output. Thus, this embodiment does not cause a cost increase.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

For example, although the above embodiment is equipped with the main electric power source 100 and the subsidiary electric power source 50 as electric power source devices, the subsidiary electric power source 50 may be omitted. In this case, it suffices that the foregoing steering assist control be performed by detecting an abnormality of the main electric power source 100, for example, a decline in the power source voltage, or the like.

Incidentally, the assist control portion 61 of the electronic control unit 60, and the motor drive circuit 30 in the embodiment may be regarded as motor control means in the invention. Besides, the process of step S18 to step S22 in the steering assist control routine that the assist control portion 61 performs may be regarded as output restriction means in the invention.

The invention claimed is:

1. A vehicle steering device comprising:
a steering mechanism that steers a wheel upon steering operation of a steering wheel;
an electric motor that is supplied with source power from an electric power source device and generates assist force that assists in the steering operation of the steering wheel;
a steering torque sensor that detects steering torque that a vehicle driver inputs to the steering wheel;
electric power abnormality detection circuitry that detects abnormality of source power supply capability of the electric power source device;
a vehicle speed sensor that detects vehicle speed; and
motor control circuitry that controls driving of the electric motor based on at least the steering torque detected by the steering torque sensor, wherein the motor control circuitry includes output restriction circuitry that decreases an output upper limit value of the electric motor as the vehicle speed detected by the vehicle speed sensor decreases while the abnormality of the source power supply capability of the electric power source device is detected by the electric power abnormality detection circuitry,
wherein the output restriction circuitry stores relation-connecting information that indicates relation of the output upper limit value of the electric motor with the vehicle speed detected by the vehicle speed sensor, and the relation-connecting information is set so that if the vehicle speed decreases, the output upper limit value of the electric motor decreases, and the motor control circuitry controls such that output of the electric motor does not exceed the output upper limit value that is found based on the relation-connecting information.

2. The vehicle steering device according to claim 1, wherein when the vehicle comes to a stop after the vehicle speed decreases, the output restriction circuitry decreases the output upper limit value of the electric motor with elapse of time following the stop of the vehicle from the output upper limit value that is set based on the relation-connecting information in a case of the vehicle speed being substantially zero.

3. The vehicle steering device according to claim 1, wherein when the vehicle starts from a stopped state, the output restriction circuitry increases the output upper limit value of the electric motor with elapse of time following the start of the vehicle up to the output upper limit value that is set based on the relation-connecting information.

4. The vehicle steering device according to claim 1, wherein the motor control circuitry includes a motor drive circuit that drives the electric motor, and
wherein the output restriction circuitry controls an upper limit of the electric power supplied from the electric power source device to the motor drive circuit so that output of the electric motor does not exceed the output upper limit value.

5. The vehicle steering control device according to claim 1, further comprising a voltage sensor that detects voltage of the electric power source device,
wherein the electric power abnormality detection circuitry detects abnormality of the source power supply capability of the electric power source device by comparing the voltage detected by the voltage sensor with a pre-set power source fail criterion voltage.

6. The vehicle steering device according to claim 1, wherein the electric power source device includes a main electric power source that supplies source power to a plurality of electrical loads provided in the vehicle, including the electric motor, and a subsidiary electric power source that is connected in parallel with and between the main electric power source and the electric motor, and that stores electric power output by the main electric power source, and that assists in supplying source power to the electric motor by using the electric power stored, and
wherein the electric power abnormality detection circuitry detects a state of being unable to supply source power from the main electric power source to the electric motor.

7. The vehicle steering device according to claim 6, further comprising a voltage sensor for detecting the voltage of the main electric power source,
wherein the electric power abnormality detection circuitry detects abnormality of the source power supply capability of the electric power source device by comparing the voltage detected by the voltage sensor with a pre-set power source fail criterion voltage.

8. The vehicle steering device according to claim 1, wherein:
   the motor control circuitry calculates a command voltage of the electric motor based on the detected steering torque, and controls the electric motor by using the command voltage; and
   if output of the electric motor exceeds the output upper limit value, the output restriction circuitry performs a control such that the output of the electric motor does not exceed the output upper limit value by re-calculating the command voltage based on a difference between the output of the electric motor and the upper limit value.

9. A method for controlling output of an electric motor that is supplied with source power from an electric power source device and generates assist force that assists in a steering operation of a steering wheel for a vehicle, the method comprising:
   detecting abnormality of source power supply capability of the electric power source device;
   detecting a vehicle speed;
   controlling the output of the electric motor so that an output upper limit value of the electric motor decreases as the detected vehicle speed decreases while the abnormality of the source power supply capability of the electric power source device is detected;
   storing relation-connecting information that indicates relation of the output upper limit value of the electric motor with the detected vehicle speed;
   setting the relation-connecting information so that if the vehicle speed decreases, the output upper limit value of the electric motor decreases; and
   controlling the output of the electric motor such that output of the electric motor does not exceed the output upper limit value that is found based on the relation-connecting information.

* * * * *